(12) United States Patent
McGonigal et al.

(10) Patent No.: US 10,304,113 B2
(45) Date of Patent: *May 28, 2019

(54) METHOD AND MEDIUM FOR DETERMINING WHETHER A TARGET ITEM IS RELATED TO A CANDIDATE AFFINITY ITEM

(75) Inventors: Charles McGonigal, Austin, TX (US); Russell Salsbury, Cambria, CA (US); Saritha Guntumadugu, Cupertino, CA (US); Mike Niemann, Austin, TX (US); Hemanth Puttaswamy, Fremont, CA (US); Srinivasa Ogireddy, San Mateo, CA (US)

(73) Assignee: International Business Machines Corporation, Armonk, NY (US)

(*) Notice: Subject to any disclaimer, the term of this patent is extended or adjusted under 35 U.S.C. 154(b) by 1519 days.

This patent is subject to a terminal disclaimer.

(21) Appl. No.: 12/615,476

(22) Filed: Nov. 10, 2009

(65) Prior Publication Data

US 2010/0121777 A1 May 13, 2010

Related U.S. Application Data

(63) Continuation of application No. 11/748,391, filed on May 14, 2007, now Pat. No. 7,636,677.

(51) Int. Cl.
G06Q 30/00 (2012.01)
G06Q 30/06 (2012.01)
G06Q 30/02 (2012.01)
G06F 16/9535 (2019.01)

(52) U.S. Cl.
CPC ..... *G06Q 30/0631* (2013.01); *G06F 16/9535* (2019.01); *G06Q 30/02* (2013.01); *G06Q 30/0282* (2013.01)

(58) Field of Classification Search
CPC .......... G06Q 30/0253; G06Q 30/0255; G06Q 30/0256; G06Q 30/0631
USPC ....... 705/26, 27, 14.23, 14.25, 14.49, 14.51, 705/14.53, 26.7
See application file for complete search history.

(56) References Cited

U.S. PATENT DOCUMENTS

| 5,754,938 | A | * | 5/1998 | Herz | G06Q 20/383 |
| | | | | | 348/E7.056 |
| 6,006,225 | A | * | 12/1999 | Bowman | G06F 17/30395 |
| 6,317,722 | B1 | * | 11/2001 | Jacobi | G06Q 30/02 |
| | | | | | 705/14.51 |
| 6,412,012 | B1 | * | 6/2002 | Bieganski | G06Q 30/02 |
| | | | | | 709/232 |

(Continued)

OTHER PUBLICATIONS https://www.cs.umd.edu/~samir/498/Amazon-Recommendations.pdf (Year: 2003).*

*Primary Examiner* — Matthew E Zimmerman
(74) *Attorney, Agent, or Firm* — Winstead, P.C.

(57) ABSTRACT

Recommendations for purchase are made based on customer behavior across multiple sessions. Correlations used for recommendations include: buy-to-buy (cross-session), view-to-view (same-session), view-to-buy (same-session), and abandon-to-buy (same-session) actions. A preview display allows a merchant to adjust recommendation algorithm weightings to achieve a desired result. A closed-loop system is provided with real-time feedback. The recommendations can be based on various segments of other users, including users of the same search engine.

20 Claims, 5 Drawing Sheets (56) References Cited

U.S. PATENT DOCUMENTS

| | | | | |
|---|---|---|---|---|
| 6,782,370 | B1 * | 8/2004 | Stack | G06Q 30/02 |
| | | | | 705/26.1 |
| 6,853,982 | B2 * | 2/2005 | Smith | G06Q 30/02 |
| | | | | 705/26.7 |
| 7,302,429 | B1 * | 11/2007 | Wanker | G06Q 30/02 |
| 7,406,436 | B1 * | 7/2008 | Reisman | G06Q 30/02 |
| | | | | 705/7.32 |
| 7,668,821 | B1 * | 2/2010 | Donsbach | G06F 17/30867 |
| | | | | 707/765 |
| 7,720,720 | B1 * | 5/2010 | Sharma | G06Q 30/0631 |
| | | | | 705/26.7 |
| 2002/0019763 | A1 * | 2/2002 | Linden | G06Q 30/02 |
| | | | | 705/14.53 |
| 2002/0103798 | A1 * | 8/2002 | Abrol | G06F 17/30616 |
| 2007/0250390 | A1 * | 10/2007 | Lee | G06Q 30/02 |
| | | | | 705/14.51 |
| 2011/0029385 | A1 * | 2/2011 | Engel | G06O 30/02 |
| | | | | 705/14.53 |

* cited by examiner

Real Time Monitor

| Historic | | |
|---|---|---|
| Computer<br>ID: 1234 | Webcam (25%)<br>ID: 3567 | Memory Stick (15%)<br>ID: 6789 |
| Flat Panel TV<br>ID: 7171 | DVD Player (40%)<br>ID: 1818 | Nachos (25%)<br>ID: 3333 |
| | | |

40

| Real Time | 12:00 AM | 2:05 AM |
|---|---|---|
| Computer<br>ID: 1234 | Webcam (10%)<br>ID: 3567 | Memory Stick (30%)<br>ID: 6789 |
| Flat Panel TV<br>ID: 7171 | DVD Player (25%)<br>ID: 1818 | Nachos (95%)<br>ID: 3333 |
| | | |

METHOD AND MEDIUM FOR DETERMINING WHETHER A TARGET ITEM IS RELATED TO A CANDIDATE AFFINITY ITEM

CROSS-REFERENCES TO RELATED APPLICATIONS

This application is a continuation of U.S. patent application Ser. No. 14/748,391, filed May 14, 2007, entitled "Method, Medium, and System for Determining Whether a Target Item is Related to a Candidate," which is hereby incorporated by reference in its entirety for all purposes.

BACKGROUND OF THE INVENTION

The present invention relates to providing recommendations for product purchases based on previous product purchases or other behavior by a customer.

Neonics, Inc. U.S. Pat. No. 4,996,642, describes selectively recommending to a user items such as movies sampled by other users. The recommendations are weighted, based on scalar ratings of the user being close to scalar ratings of other users for some product both have reviewed.

MNI Interactive. U.S. Pat. No. 5,583,763 describes a user designating his or her preferred selections as entries in a user's preference list. Entries in the user's list are compared with entries in the other users' lists. When a significant number of matches have been found between two lists, the unmatched entries of the other user's preference list are extracted. Those unmatched entries with a high correlation to the user's preference list are presented to the user as selections in which the user is likely to be interested.

Cendant Publishing U.S. Pat. No. 6,782,370 describes allowing customers to submit goods or services to be used as filter data when providing recommendations based on customer buying history.

Amazon.com U.S. Pat. No. 6,266,649 describes a recommendations service that recommends items to individual users based on a set of items that are known to be of interest to the user, such as a set of items previously purchased by the user. In the disclosed embodiments, the service is used to recommend products to users of a merchant's Web site. The real-time service generates the recommendations using a previously-generated (off-line) table which maps items to lists of "similar" items. The similarities reflected by the table are based on the collective interests of the community of users.

Amazon.com U.S. Pat. No. 6,912,505 describes determining relationships between products by identifying products that are frequently viewed by users within the same browsing session (e.g., products A and B are related because a significant portion of those who viewed A also viewed B). The resulting item relatedness data is stored in a table that maps items to sets of related items. The table may be used to provide personalized product recommendations to users.

Amazon.com U.S. Pat. No. 7,113,917 is similar, relating to items actually selected (e.g., in a shopping cart).

BRIEF SUMMARY OF THE INVENTION

The present invention provides the ability to make recommendations to customers based on a variety of tracked customer behaviors. In one embodiment, behavior by a customer can be tracked across a session, and across multiple sessions, including Lifetime Individual Visitor Experience Profiles (LIVE Profiles). The system can track browsing, buying and abandoning actions. By correlating these to behaviors of other customers, recommendations of affinity products can be made. For example, the following correlations can be used for recommendations: buy-to-buy (cross-session), view-to-view (same-session), view-to-buy (same-session), and abandon-to-buy (same-session) actions.

In one embodiment, a merchant is provided with a preview display. The preview display shows the actual recommendations that would be made based on the weightings applied to different correlations in an algorithm. The merchant can thus adjust the weightings, create exceptions or overrides, or take other action to get the desired results. After such adjustments, the merchant can export the results and affinity product data to the merchant's web site for actual usage.

In another embodiment, a closed-loop system is provided. The merchant is provided with a display providing real-time feedback on the performance of the recommendation algorithm. The real-time feedback shows the correlated products, and tracks the actual sales, browsing and abandoning. The merchant can thus instantly see the results of changes (different weightings, etc.) in the recommendation algorithm.

In one embodiment, the feedback is provided in real time by aggregating the monitored data by the web analytics server into aggregate groups. The aggregate data is then stored in a hierarchical structure in a RAM in the analytics server system. The data is then provided from said RAM to a client at a client computer.

In one embodiment, the recommendations can be based on different segments of users. For example, the segment of users whose behavior is used to generate the recommendations could be users of the merchants website, users of all merchants in a particular market segment, user characteristics, users using the same search engine, vertical or horizontal market segments, etc.

DETAILED DESCRIPTION OF THE INVENTION

Overall System

Figure 1:
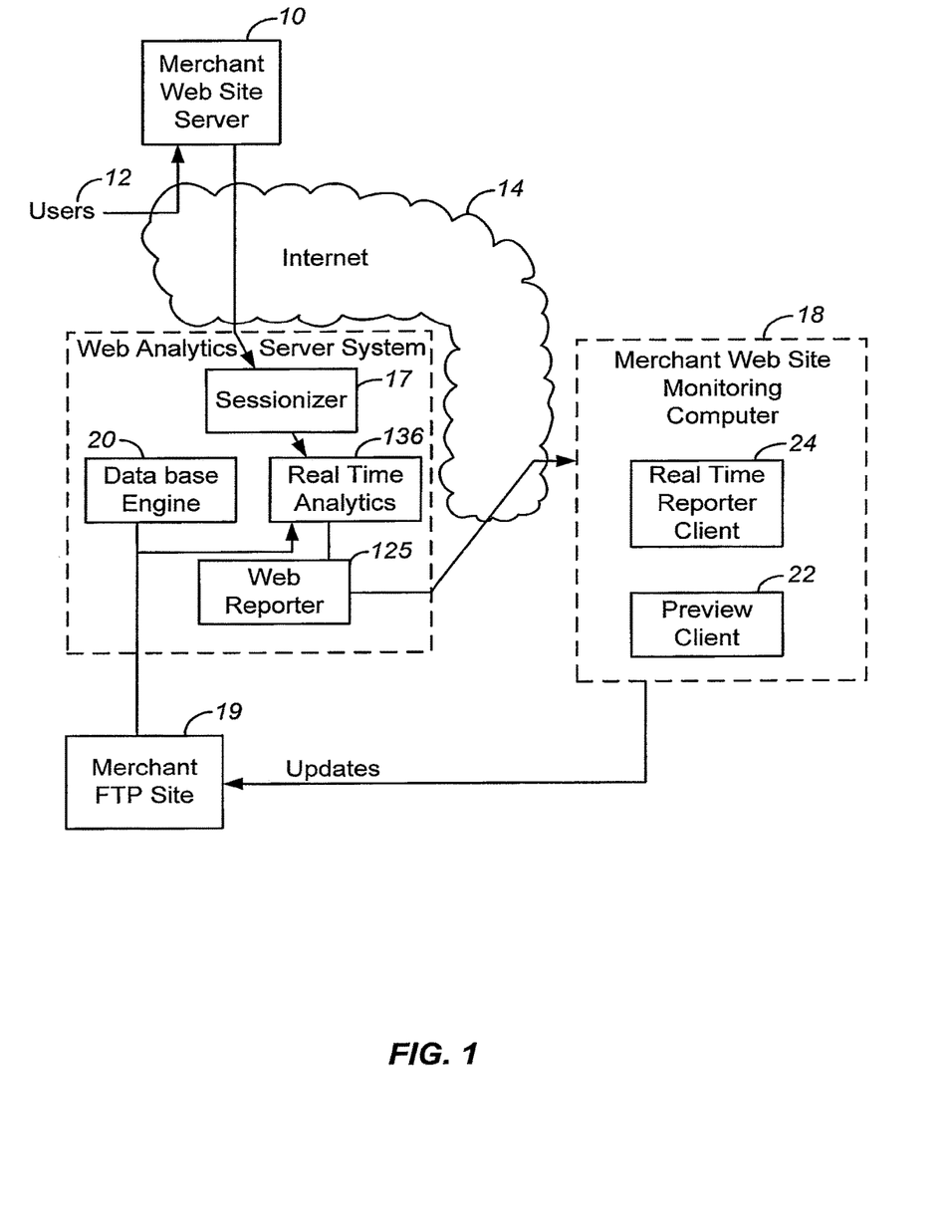
FIG. 1 is a diagram of a system according to an embodiment of the present invention.

FIG. 1 is a diagram of a system according to an embodiment of the present invention. A merchant web site server 10 is visited by users 12 over the Internet 14. Traffic to the merchant web site is monitored by web analytics server system 16. System 16 provides data over the Internet to a merchant web site monitoring computer 18 and a merchant FTP (File Transfer Protocol) site 19.

Data on user traffic is stored in a database of database engine 20 in web analytics server system 16. A sessionizer 17 organizes the data into user sessions, as described in co-pending application Ser. No. 11/546,923, filed Oct. 11, 2006. The system also includes a web reporter 125 and a real-time analytics application 136. Merchant computer 18 includes a preview client module 22 that interacts with web reporter 125, and a real-time reporter client 24 that interacts with real-time analytics application 136.

Weighted Algorithm

In one embodiment, analytics system 16 tracks lifetime user behavior. The same user can be tracked over multiple sessions, and also may be tracked at different merchant sites (of merchants subscribing to the web analytics system). For example, when user A browses a product, the system can determine the group of other users who browsed the same product. Other products bought by those other users can be determined, and the most common product bought (and not bought by user A) can be provided as a recommendation to user A. Alternately, the recommendation could be the next most common product bought if, for example, the most common product is already being discounted and the merchant wants to promote another product. Alternately, the most common product browsed can be recommended to user A. A variety of affiliations are possible based on different user actions. These affiliations are described in an algorithm, with different weightings applied by the merchant.

In one embodiment, four kinds of weights to specify different probabilities to inter-relate various actions performed by the customer across sessions while visiting the e-commerce website. These weights combine the most common affiliated product in buy-to-buy (BB, cross-session), view-to-view (VV, same-session), view-to-buy (VB, same-session), and abandon-to-buy (AB, same-session) actions. These weights can be interactively adjusted for providing flexibility for users to control their recommendations. Other embodiments use more scores, consisting of these 3 attributes and add-to-carts. In one example, the merchant can select the variables a, b, c and d between 0 and 100% to select a recommended product according to the formula: Recommendation=(a×BB)+(b×VV)+(c×VB)+(d×AB). The formula can further compare the recommendation to products already viewed or bought by a particular user, and can change to a next most common affiliated product if the user has already viewed or bought the first choice for a recommendation. Alternate formulas could be used, such as including the second or third most common affiliated product in each category (BB, VV, VB, AB).

Preview

Figure 2A:
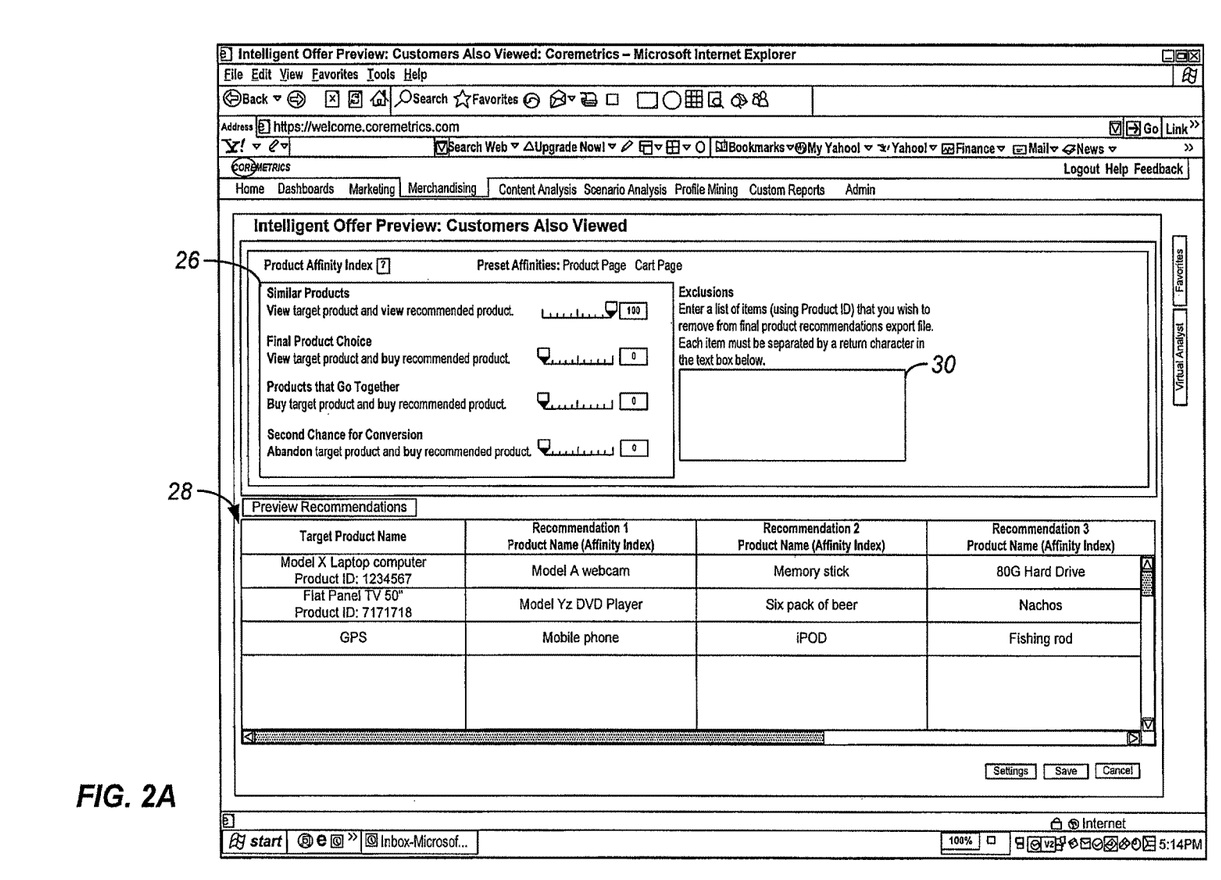
FIGS. 2a-2B are diagrams of preview and export settings screens according to one embodiment of the preview module of FIG. 1.

FIG. 2A is a diagram of a preview screen according to one embodiment of the preview module of FIG. 1. A window 26 displays four relationships and their associated weightings. "Similar Products" signifies that user 1 is viewing (browsing) product A, and is being recommended a product X viewed by other users that also viewed product A (where product X has not been viewed by user 1). "Final Product Choice" buy signifies that user 1 is viewing product A, and is being recommended a product X bought by other users that also viewed product A (where product X has not been bought by user 1). "Products that Go Together" signifies that user 1 is buying product A, and is being recommended a product X bought by other users that also bought product A (where product X has not been bought by user 1). "Second Chance for Conversion" signifies that user 1 is abandoning product A (put in the cart but not bought) and being recommended a product X bought by other users that also viewed product A (where product X has not been abandoned or bought by user 1). It will be appreciated that many variations of the algorithm are possible. For example, an abandon-buy relationship can be used, or a buy-browse, or any other combination. There could be more or less than four relationships weighted.

Window 26 includes a weighting for each of the four categories. These are shown as rating from 0 to 100 in the example. The merchant can adjust these weighting, and see the effect in preview window 28. The recommendation preview window 28 shows a Target Product Name in the first column (such as a Model X laptop computer A which can be browsed by user 1) and one or more affinity products that will be recommended according to the formula and weightings chosen. Three affinity products are shown in the example of FIG. 2A. In one embodiment, the preview window shows a small subset of all recommendations at any one time. The products displayed in the first column can be either the most popular browsed products, or other products the merchant selects. The affinity products recommended in the second-fourth columns apply the algorithm and weightings to the database engine 20 which contains the browsing, buying, abandoning, etc. behavior of all visitors to the merchant's website. The merchant can then adjust the weightings in window 26 and see, in window 28, the effect on what products are recommended.

The merchant can also exclude certain products or categories of products from being recommended by entering them in exclusion window 30. For example, the merchant may not want to recommend products that are already selling well and are the most popular, or products that are discounted or otherwise being marketed by different means. This eliminates any bias towards new products or popular products associated with events happening across the World.

Figure 2B:
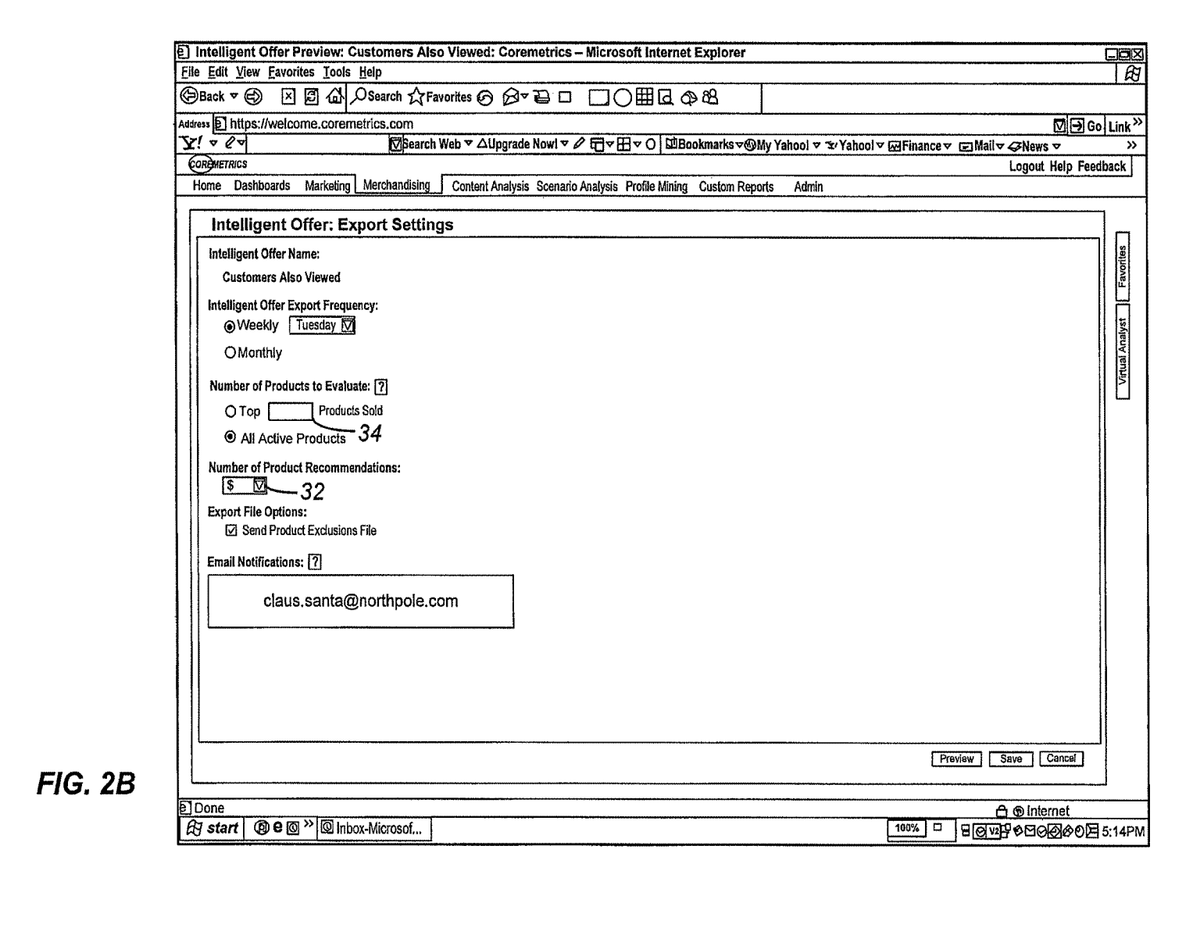

In one embodiment, additional options allow customizing the number of recommendations according to e-commerce merchant needs. This can be done with an Export Settings window as shown in FIG. 2B. It can cap the results at any number of target items or unlimited, as well as capping per-target recommendations at any number from 1 to 10. For example, the merchant can enter a cap on the number of recommendations per product or keyword in selection box 32. For example, the merchant may want only one or two products recommended. The merchant can also cap the number of target products from which recommendations will be drawn in selection box 34.

In another embodiment of the invention, recommendation preview window 28 is used to show a preview of recommendations based on keywords. This can be used for words searched by the user either on the merchant's site, or on the search engine which led to the merchant's site. The recommendations can be displayed to the user on the merchant's web site. Alternately, if the merchant has an advertising arrangement with a search engine, the recommendations could be displayed along with the search results when the user enters the key words in the search engine.

An alternate view of window 26 can be provided with different keyword affinities. For example, keyword-browse, keyword-abandon, keyword-buy. Further gradations can be specified, such as whether the keyword or affinity product is on the merchant site, the search engine, or any merchant site in a category. In one embodiment, a weighting algorithm can combine both keywords and products browsed, bought, etc.

Real-Time Monitor

Figure 3:
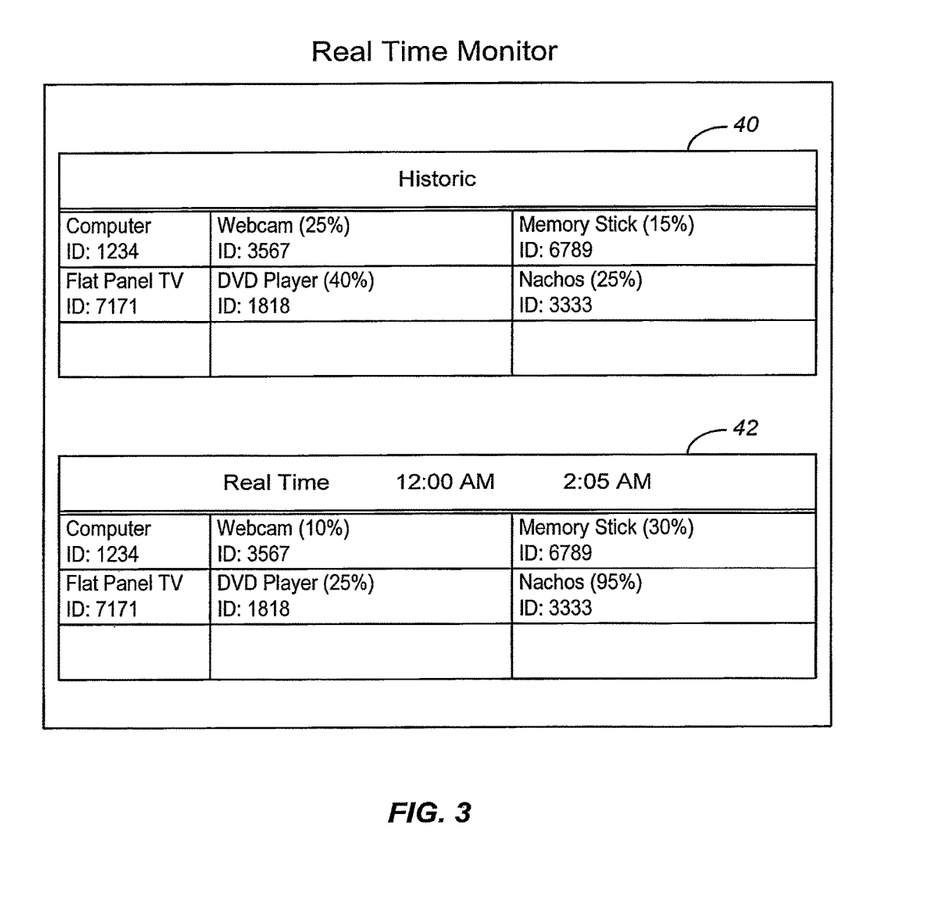
FIG. 3 is a diagram of a real-time reporter screen according to one embodiment of the real-time reporter module of FIG. 1.

FIG. 3 is a diagram of a real-time reporter screen according to one embodiment of the real-time reporter module of FIG. 1. A Historic window 40 shows the historic results with the product being bought, viewed or abandoned in the first column, followed by the recommended products in the following columns. Each recommended product shows the conversion percentage in parenthesis. A second window 42 provides real-time results, with the period of time selectable by the merchant. This provides the merchant with real time feedback on the success of the recommendations. If a product is not selling well, the merchant can tweak the weightings, change exclusions, etc. For example, if there is a high rate of abandonment, a discount could be offered on that product. The real time feedback is made possible using the system described below.

In one embodiment, the feedback is provided in real time by aggregating the monitored data by the web analytics server into aggregate groups. The aggregate data is then stored in a hierarchical structure in a RAM in the analytics server system. The data is then provided from said RAM to a client at a client computer.

Figure 4:
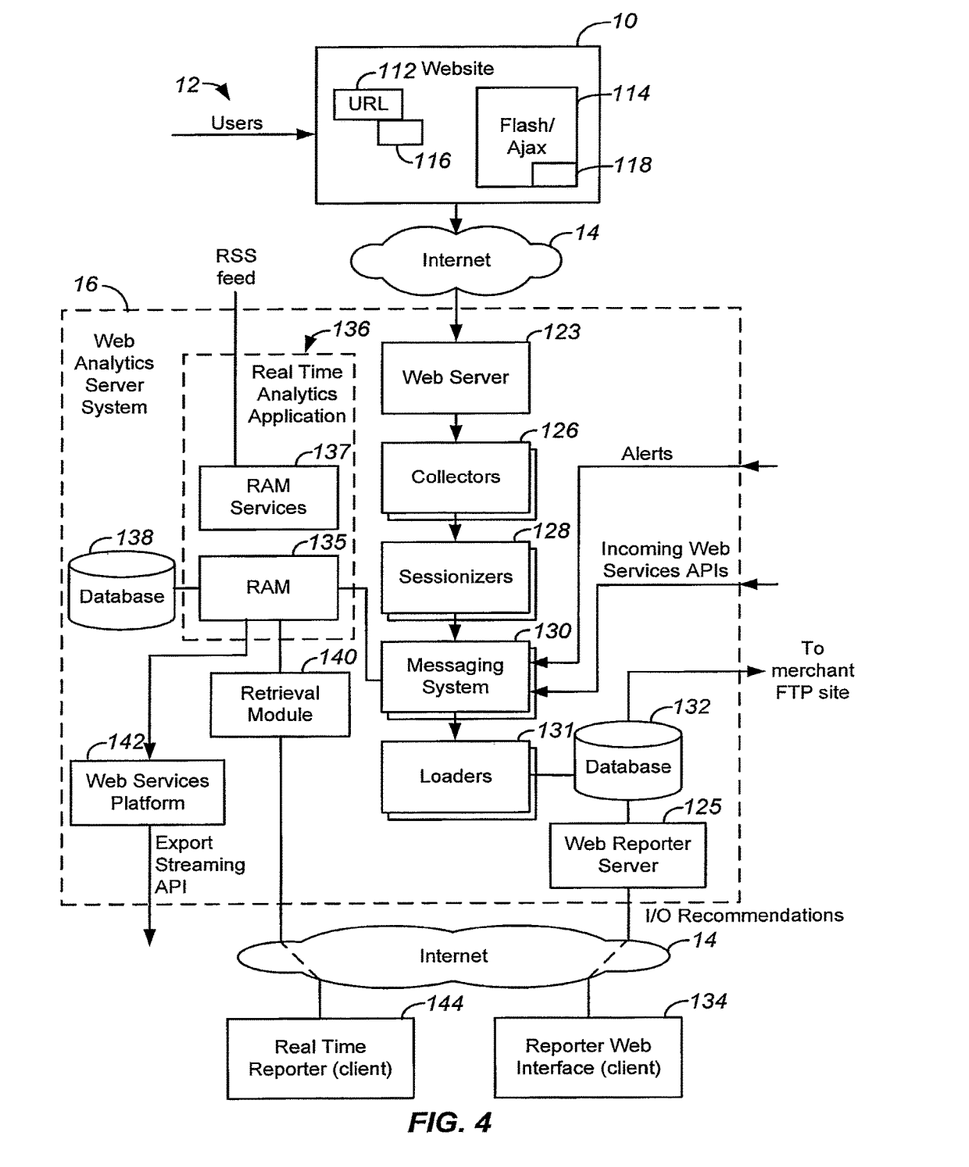
FIG. 4 is a diagram of one embodiment of the web analytics server system of FIG. 1.

FIG. 4 is a diagram of one embodiment of the web analytics server system of FIG. 1, showing the real-time analytics module. More details can be found in co-pending application Ser. No. 11/546,923, filed Oct. 11, 2006, the disclosure of which is hereby incorporated herein by reference. A merchant web server 10 provides web pages which are downloaded to a client (user) computer, and include URLs 112 and Flash, Ajax, Java, or other local applications 114. Each of the components referred to has associated metadata request elements 116 and 118, respectively, for tracking clicks by the users 12. The metadata request elements collect the user click information and transmit it over the internet 14 to a web analytics or tracking server system 16.

Data is initially provided to a group of web servers, or pixel servers, 123 as a log of click stream data. Multiple collectors 126 pull the data, sort the data by session (using the session ID), and provide the data in multiple messaging queues to the sessionizers (transformers) 128. The data for the same session is sent to the same sessionizer based on a hash ID algorithm. The sessionizers organize the collected data as discussed below, then provide it in different formats and based on various business and statistical logic through a variety of different messaging systems 130 to different targets that include but are not limited to: 1—real time in-memory streaming for real time in-memory analytics; 2—real time in memory streaming through a variety of application APIs for other applications; 3—used for long term database loading or other storage media.

Any of these messaging systems 130 can pass on any number of well defined alerts coming from any external sources to the RAM 135. RAM 135 may also directly receive an RSS feed through the internet. Thus, data from different sources including the session data from the sessionizer, the alerts or other data types from other external sources can be combined and processed, using any business logic or statistical data analysis in the RAM and made available for real time viewing to any target. Examples include, for the same client, not only web data, but call center data, bricks and mortar store data, giving a complete overview of business models defined and represented using the data.

The data in RAM 135 is provided to a variety of web services platforms 142, which are available for external vendors to pull through any APIs for export streaming. Also, the data from RAM 135 is accessed by a real time browser based application 144. Real-Time Analytics Application 136 includes RAM for storage 135 and RAM based services 137. RAM based services 137 are programs stored in the main memory of a server which controls the storing, processing, aggregating, accessing, authenticating, authorizing, etc. of data in the RAM. Such services include a de-serializing service, an aggregator service, a localizer service, a security service, a messaging service, a recovery service, and/or any other service defined on the data in RAM.

Real time reporter 144 may reside on a client computer or may be downloaded from a web analytic server, and can use Flash, Ajax, a local application or other methods for requesting and rendering reports. The data for the reports is requested from Web Analytics Server 16 across the Internet 14. Independent modules within the real time reporter program 144 will retrieve data in RAM 135 from real time analytics application 136 asynchronously using interface module 140, through different protocols (HTTPs, Flash, Ajax, etc.) for the real time interactions.

The system of FIG. 4 is designed to respond at the speed of accessing the data in memory and processing the data in memory. It can also handle data for a large number of clients across a large number of geographically distant web servers. In one embodiment, collectors 126 include a large numbers of servers, with associated disk drive storage. There could typically be fewer servers for sessionizers 128, and even fewer servers making up messaging system 130, all with associated disk drives. Loaders 131 may include dozens of servers and associated disk drives. RAM 135 could be a single or multiple banks of RAMs.

In one embodiment, the real-time monitor can be used to provide the last 7 days of data on the top 100 products of a merchant. The merchant could vary the recommendations daily, based on browsing of the top 100 products. Alternately, other numbers of products or time periods could be used. The real-time monitor will show the actual sales being made based on the recommendations soon after they occur, allowing the merchant to adjust quickly to changing conditions.

LIVE Profile Segmentation

In one embodiment, the recommendations can be based on different segments of users. For example, the segment of users whose behavior is used to generate the recommendations could be users of the merchant's website. Alternately, because the web analytics is typically provided by a third party to multiple merchants, the segment can be users of all merchants in a particular market segment. For example, if the merchant is a shoe store, the segment could be all shoe stores, all clothing stores, all women's shoe and/or clothing stores, all users in a particular geographic area, or any combination. The recommendations can also be segmented by any other information available, such as the net worth of the users, the purchase volume or average price per product bought by the users (e.g., high end users), users browsing at the same time of day or seasons, users using the same search engine, vertical or horizontal market segments, etc.

In one embodiment, behavior by a customer can be tracked across a session, and across multiple sessions, including Lifetime Individual Visitor Experience Profiles (LIVE Profiles) of Coremetrics. The system can track browsing, buying and abandoning actions for each user over the online lifetime of that user.

Search Engine Source

In one embodiment, the search engine used by customers to reach the merchant's site is tracked. This can form the basis of another segmentation, with recommendations being drawn from the group of users that came to the merchant's site using the same search engine. Additionally, based on this information, recommendations can be made to the customers by providing the recommendation before the customer even reaches the merchant's web site, by providing a recommendation upon entry of certain key words in the search engine. The merchant can accomplish this through an advertising arrangement with the search engine provider. Alternately, the recommendation can be made on the basis of the keywords used to reach the merchant site, and displayed on the merchant site.

Embodiments of the present invention thus provide a system that offers and algorithm using conditional probability to calculate the recommendations based on past history of product page views and purchases by online customers. The system is generic enough that it can be applied across any kind of retail ecommerce site. It provides an interactive mechanism to fine tune the recommendations at any time according to merchant's requirements. The system can adaptively increase the efficiency of the recommendations by tracking the effectiveness of the recommendations presented. This information can be used in the subsequent calculations of recommendations. The effectiveness can be improved using real-time feedback.

It will be understood that modifications and variations may be effected without departing from the scope of the novel concepts of the present invention. For example, other actions of users could be track and correlated or segmented, such as particular browsing actions including dwell time on a particular web page, viewing of particular news stories, amount of time spent surfing, etc. Alternately, physical characteristics can be correlated or segmented, such as those inferred from product purchases (shoe size, dress size), etc. Also, although the term "products" has been used herein, it is understood to include services, categories or groupings of products and categories or groupings of services. Additionally, the recommendations can include any sort of qualification or terms, such as a discount for buying in the next hour. Accordingly, the foregoing description is intended to be illustrative, but not limiting, of the scope of the invention which is set forth in the following claims.

What is claimed is:

1. A method for recommending affinity products, the method comprising:
   collecting data corresponding to monitored actions of a user of a web site, the monitored actions collected over a plurality of browsing sessions;
   aggregating said collected data into aggregate groups, wherein said collected data comprises speedometer data which is aggregated and stored for values exceeding a threshold value in order to limit RAM usage;
   identifying, with a server computer, at least one affinity product related to a target product, the identifying based on the monitored actions and a weighted formula, wherein weights are used to specify different probabilities to interrelate actions performed by said user across sessions while visiting said web site, wherein said weights combine a common affiliated product in a buy-to-buy, view-to-view, view-to-buy and abandon-to-buy actions;
   receiving a selection of variables a, b, c and d assigned a percentage between 0 and 100% to select a recommended affinity product according to said weighted formula:

$(a \times BB)+(b \times VV)+(c \times VB)+(d \times AB)$, wherein said BB corresponds to said buy-to-buy action, wherein said VV corresponds to said view-to-view action, wherein said VB corresponds to said view-to-buy action, and wherein said AB corresponds to said abandon-to-buy action;
   displaying, with the server computer, a preview of the at least one affinity product and said stored speedometer data shown in a report module of a speedometer;
   modifying at least one weight of the weighted formula; and
   displaying, with the server computer, an updated preview showing any change in the at least one affinity product due to the modifying.

2. The method of claim 1 further wherein said at least one affinity product comprises a plurality of affinity products.

3. The method of claim 2 further comprising:
   receiving a selection of at least one product to exclude from identification as said at least one affinity product.

4. The method of claim 2 wherein said weighted formula provides at least two correlations of a browsing or buying action of a first product by a first user with browsing, abandoning or buying actions of a group of users who also browsed or bought said first product.

5. The method of claim 2 wherein said monitored actions include keywords, and said at least one affinity product is a product on which action was taken by a group of users who used the same keyword.

6. The method of claim 2 further comprising:
   receiving a selection indicating a number of affinity products to be identified.

7. The method of claim 2 further comprising:
   displaying a conversion measure for the at least one affinity product in the displayed preview.

8. The method of claim 1 further comprising:
   exporting a list of the at least one affinity product to a merchant's web site for use in displaying the at least one affinity product when the target product is displayed.

9. A method for recommending affinity products, the method comprising:
   collecting data corresponding to monitored actions of a user of a web site, the monitored actions collected over a plurality of browsing sessions;
   aggregating said collected data into aggregate groups, wherein said collected data comprises speedometer data which is aggregated and stored for values exceeding a threshold value in order to limit RAM usage;
   providing a formula for identifying affinity products based on said monitored actions, wherein weights are used to specify different probabilities to interrelate actions performed by said user across sessions while visiting said web site, wherein said weights combine a common affiliated product in a buy-to-buy, view-to-view, view-to-buy and abandon-to-buy actions;
   receiving a selection of variables a, b, c and d assigned a percentage between 0 and 100% to select a recommended affinity product according to said formula:

$(a \times BB)+(b \times VV)+(c \times VB)+(d \times AB)$, wherein said BB corresponds to said buy-to-buy action, wherein said VV corresponds to said view-to-view action, wherein said VB corresponds to said view-to-buy action, and wherein said AB corresponds to said abandon-to-buy action;
   tracking said monitored actions for an identified segment of users;
   selecting, with a server computer, at least one affinity product using said formula and said monitored actions of said segment of users; and
   displaying, with the server computer, a preview of the at least one affinity product and said stored speedometer data shown in a report module of a speedometer.

10. The method of claim 9 wherein said segment is selected from the group of segments comprising product market segment, time related segment, user characteristic segment, geographical segment and browsing action segment.

11. The method of claim 9 wherein said at least one selected affinity product is selected based on a relation to a target product.

12. The method of claim 9 further comprising:
excluding at least one affinity product from display if it is contained on a list of excluded affinity products.

13. The method of claim 9 wherein the collected data is collected from a plurality of web sites operated by a plurality of web site operators.

14. The method of claim 13 wherein said formula identifies said affinity products based on cross session and cross web site monitored actions.

15. The method of claim 9, wherein said formula identifies said affinity products based in part on a conversion measure of affinity products.

16. The method of claim 11, further comprising:
exporting said selected affinity product for display on a results page of a search engine; and
displaying said selected affinity product when a search performed on the search engine results in the target product.

17. A computer program product for recommending affinity products, the computer program product comprising a non-transitory computer readable storage medium having program code embodied therewith, the program code comprising the programming instructions for:
collecting data corresponding to monitored actions of a user of a web site, the monitored actions collected over a plurality of browsing sessions;
aggregating said collected data into aggregate groups, wherein said collected data comprises speedometer data which is aggregated and stored for values exceeding a threshold value in order to limit RAM usage;
identifying, with a server computer, at least one affinity product related to a target product, the identifying based on the monitored actions and a weighted formula, wherein weights are used to specify different probabilities to interrelate actions performed by said user across sessions while visiting said web site, wherein said weights combine a common affiliated product in a buy-to-buy, view-to-view, view-to-buy and abandon-to-buy actions;
receiving a selection of variables a, b, c and d assigned a percentage between 0 and 100% to select a recommended affinity product according to said weighted formula:

$$(a \times BB)+(b \times VV)+(c \times VB)+(d \times AB),$$

wherein said BB corresponds to the buy-to-buy action, wherein said VV corresponds to the view-to-view action, wherein said VB corresponds to the view-to-buy action, and wherein said AB corresponds to the abandon-to-buy action;
displaying, with the server computer, a preview of the at least one affinity product and said stored speedometer data shown in a report module of a speedometer;
modifying at least one weight of the weighted formula; and
displaying, with the server computer, an updated preview showing any change in the at least one affinity product due to the modifying.

18. The computer program product as recited in claim 17, wherein said at least one affinity product comprises a plurality of affinity products.

19. The computer program product as recited in claim 18, wherein the program code further comprises the programming instructions for:
receiving a selection of at least one product to exclude from identification as said at least one affinity product.

20. The computer program product as recited in claim 18, wherein said weighted formula provides at least two correlations of a browsing or buying action of a first product by a first user with browsing, abandoning or buying actions of a group of users who also browsed or bought said first product.

* * * * *